(12) United States Patent
Kamau et al.

(10) Patent No.: US 11,274,806 B2
(45) Date of Patent: Mar. 15, 2022

(54) ILLUMINATING DEVICE FOR VEHICLES

(71) Applicant: Hella GmbH & Co. KGaA, Lippstadt (DE)

(72) Inventors: Edwin N. Kamau, Bonn (DE); Martin Mügge, Geseke (DE); Alfons Michaelis, Borchen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/608,513

(22) PCT Filed: Apr. 27, 2018

(86) PCT No.: PCT/EP2018/060915
§ 371 (c)(1),
(2) Date: Oct. 25, 2019

(87) PCT Pub. No.: WO2018/202582
PCT Pub. Date: Nov. 8, 2018

(65) Prior Publication Data
US 2021/0108776 A1    Apr. 15, 2021

(30) Foreign Application Priority Data

May 2, 2017   (DE) ..................... 10 2017 109 314.1

(51) Int. Cl.
*F21S 43/20*    (2018.01)
*F21S 43/50*    (2018.01)
(Continued)

(52) U.S. Cl.
CPC ............... *F21S 43/26* (2018.01); *F21S 43/14* (2018.01); *F21S 43/15* (2018.01); *F21S 43/31* (2018.01);
(Continued)

(58) Field of Classification Search
CPC .. F21S 43/26; F21S 43/50; F21S 43/40; F21S 43/14; F21S 43/31; F21S 43/15
See application file for complete search history.

(56) References Cited

FOREIGN PATENT DOCUMENTS

DE    4421306 A1 *   1/1995   ............. F21V 5/002
DE    4421306 A1     1/1995
(Continued)

*Primary Examiner* — Anabel Ton
(74) *Attorney, Agent, or Firm* — Husch Blackwell LLP

(57) ABSTRACT

An illuminating device for vehicles is provided with a housing closed off by a transparent covering plate. A light source unit contains at least a first and a second light source. An optical unit contains a hologram element for generating a illuminated holographic figure are arranged. The optical unit has at least one shutter element for limiting an emission angle range (φ) of the light source, such that the optical unit has a first optical component allocated to the first light source and a second optical component allocated to the second light source by means of which light emitted by the light sources can be deflected in the direction of the hologram element. A transitional area between the optical components a screening element extends in such a way that scattered light emitted by the first light source that does not hit the allocated first optical component is prevented from hitting the adjacent second optical component and such that, vice versa, scattered light emitted from a second light source that does not hit the second optical component is prevented from hitting the first optical component.

10 Claims, 3 Drawing Sheets

(51) Int. Cl.
  *F21S 43/40* (2018.01)
  *F21S 43/14* (2018.01)
  *F21S 43/31* (2018.01)
  *F21S 43/15* (2018.01)
  *G03H 1/22* (2006.01)

(52) U.S. Cl.
  CPC .............. *F21S 43/40* (2018.01); *F21S 43/50* (2018.01); *G03H 1/2202* (2013.01)

(56) References Cited

FOREIGN PATENT DOCUMENTS

| | | |
|---|---|---|
| DE | 102013108333 A1 | 2/2015 |
| DE | 102015102243 A1 | 9/2016 |
| JP | 09039653 A | 2/1997 |
| KR | 20160073741 A | 6/2016 |
| WO | 2017102459 A1 | 6/2017 |
| WO | 2018054734 A1 | 3/2018 |

\* cited by examiner of the light source) of the light source hit an edge area and/or edge of a reflector or another optical component of the optical unit. This advantageously ensures already "at the source" that, essentially, useful light can enter one chamber of a hologram module formed in this way, while scattered light is prevented from entering the chamber. The shutter element is thus preferentially arranged at least partially in the area of the light source.

ILLUMINATING DEVICE FOR VEHICLES

CROSS REFERENCE

This application claims priority to PCT Application No. PCT/EP2018/060915, filed 27 Apr. 2018, which itself claims priority to German Application No. 10 2017 109314.1, filed 2 May 2017, the entirety of both of which are hereby incorporated by reference.

FIELD OF THE INVENTION

The invention relates to an illuminating device for vehicles with a housing closed by a transparent covering plate in which a light source unit with at least a first and a second light source and in which an optical unit with a hologram element are arranged to generate an illuminated holographic figure.

BACKGROUND

An illuminating device for vehicles with a housing in which several light modules are arranged is known from DE 10 2015 102 243 A1. A light module has a light source unit with a light source and an optical unit provided with a hologram for generating an illuminated holographic figure. The light source is positioned in such a way relative to the hologram element that light emitted from the same hits the hologram element at a specified reconstruction angle and in this way the desired illuminated holographic figure is generated outside of the housing. As the light is emitted at a relatively large radiation angle, undesired scattered light can be reflected by the inner walls of the housing and hit the hologram element. This gives rise to additional background brightness that leads to a reduction in the contrast of the illuminated holographic figure. Particularly when several light sources are used to generate the illuminated holographic figure, it is desirable to reduce the amount of scattered light to the greatest possible extent.

SUMMARY OF THE INVENTION

The task of the present invention is consequently to further develop an illuminating device for vehicles with a hologram element in such a way that the occurrence of scattered light is prevented or kept to a minimum in a simple manner, especially when the hologram element is designed to cover a large area and is to be backlit with relatively strong light.

To solve this task, the optical unit has at least one and preferentially several shutter elements to limit an emission angle range of the light source, the optical unit has a first optical component allocated to the first light source and a second optical component allocated to the second light source with which light emitted from the respective light source can be directed to the hologram element, where in a transitional area between the optical components a screening element extends in such a way that infringing light from one light source to the adjacent optical component is avoided, meaning that no scattered light is generated that, in turn, cannot hit the hologram element at a specified reconstruction angle.

Firstly the occurrence of undesired scattered light is prevented by the presence of at least one shutter element by means of which an emission angle range of the light source can be limited, preferentially to such an extent that border rays (greatest possible angle to the main axis/optical axis of the light source) of the light source hit an edge area and/or edge of a reflector or another optical component of the optical unit. This advantageously ensures already "at the source" that, essentially, useful light can enter one chamber of a hologram module formed in this way, while scattered light is prevented from entering the chamber. The shutter element is thus preferentially arranged at least partially in the area of the light source.

Secondly, in a transitional area between the first and second optical components of the optical unit a screening element is arranged extending in such a way that it prevents scattered light radiated by the light source hits an optical component that is arranged to be adjacent to the component actually assigned. Vice versa, this screening element has the effect that scattered light from a light source allocated to the adjacent component can hit the optical unit for the first light source. The invention therefore facilitates an extensive reduction in the amount of scattered light so that it is essentially useful light only that can hit the optical component, which deflects the light in the direction of the hologram element arranged downstream in the luminous flux. The reflector can thus deflect the light emitted by the light source at a reconstruction angle in the direction of the hologram element and thus generate a contrast-rich illuminated holographic figure. The illuminated holographic figure can, for example, represent a legally stipulated illuminated area or an advice symbol or the like.

The number of light sources and optical components are in this respect not limited to two. Rather, more than two light sources can also be provided for with assigned optical component in each case. Preferentially, a screening element is then arranged in each transitional area between respective adjacent optical components in order to prevent scattered light from hitting the respective non-allocated optical component but the adjacent one.

In particular, the optical components can be reflectors. In this context, the first and second (and potentially further) reflectors can be formed as one piece, for example. The optical components, or at least one of them, can, however, also be another type of optical element, e.g. a lens, a diffractive optical element, or the like.

It is advantageous to provide for several reflectors as optical components with light sources arranged in different ways in each case, where the useful light hitting the reflectors in each case is reflected in the direction of the same hologram element. This makes it possible to backlight the hologram element with strong light, which constitutes an advantage. The illuminated holographic figure intended as a signal function can thus be generated in a way that is contrast rich with sharp contours.

According to one refinement, the screening element rises between the optical components, namely from one side of an extension level of the optical components pointing in the direction of the light source and the hologram element. In this respect, the screening element acts as a separating element between components that preferentially have an optical effect.

According to one refinement of the invention, the screening element extends vertically to the extension level of the optical components and/or in the direction of an optical axis of the optical components. In particular when the optical components parallelize the respective light hitting them, such an orientation of the screening element is able to ensure that the useful light hitting the optical components also hits the hologram element.

According to one refinement of the invention, several optical components are arranged next to each other in a row.

In this respect, the optical components can in particular be connected to each other as one piece. Different light sources are allocated to each of the optical components that are positioned on a common carrier. The carrier runs parallel to the series of optical components. In this way it is possible for a powerful illuminated holographic figure to be created in a way that saves space, which constitutes an advantage. If the optical components are designed and aligned in such a way that they deflect the light hitting them in each case to different hologram elements, this means that several different illuminated holographic figures can be generated in a way that saves space.

According to a refinement of the invention, the screening element is connected in a force and/or form-locking manner to one of the optical assemblies with the optical components. The screening element can thus be manufactured as a separate component from the optical components and can be provided with a surface quality that acts as a diffuser.

Alternatively, the screening element can be designed in such a way that it is molded onto the assembly. The screening element can be manufactured simply together with the optical components, in particular by means of an injection molding tool, which constitutes an advantage.

According to a preferential embodiment of the invention, the screening elements are provided with an antireflective surface that can be applied by means of a coating on a base body or realized as a structure when injection molding the screening element. This makes it possible to avoid light reflections of all kinds on the screening element, which constitutes an advantage.

According to a refinement of the invention, the screening element is formed as a matte black surface acting as a diffuser. If the optical components are formed as a reflector, the screening element can, for example, be manufactured together with the reflector by means of injection molding, where merely the reflector is provided with a mirrored surface in a further process step. In contrast, the screening element has a black surface in accordance with the specified color of the plastic mass chosen.

In a refinement of the invention, the screening element is formed in the shape of a parallelogram or of a triangle in such a way that the useful light can be deflected, depending on the form of the optical component or positioning relative to the light source.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
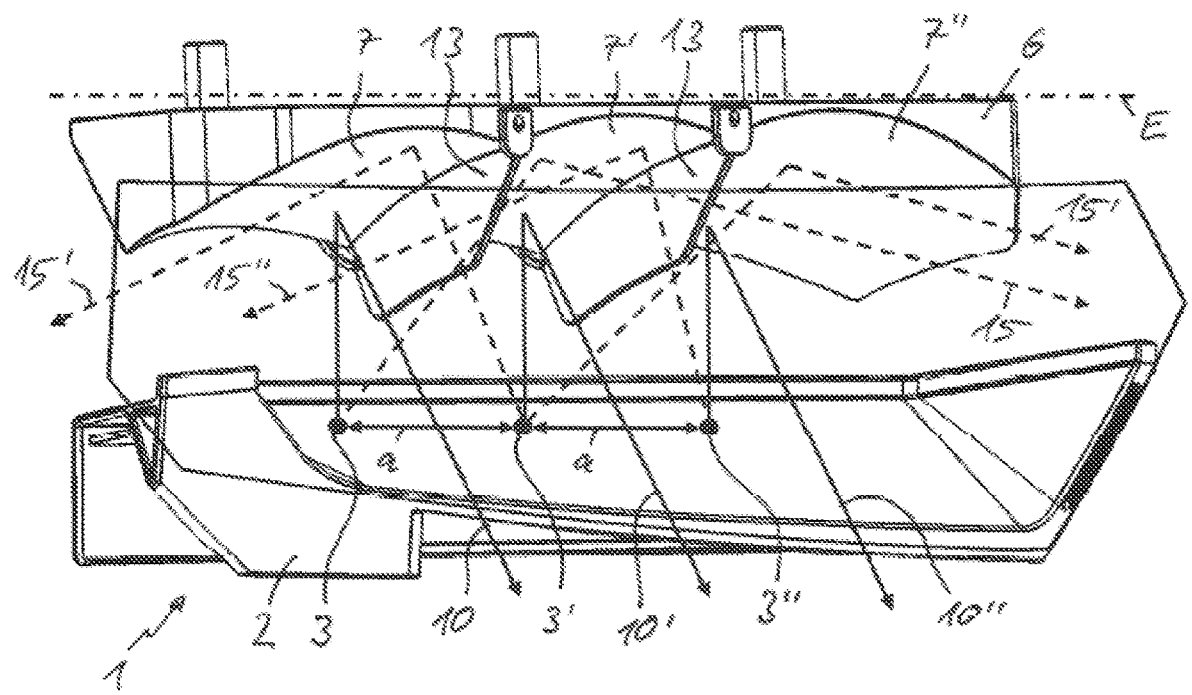
FIG. 1 is a top view of an illuminating device with separately manufactured screening elements that are fastened in a force and/or form-locking manner to an assembly.
Figure 2:
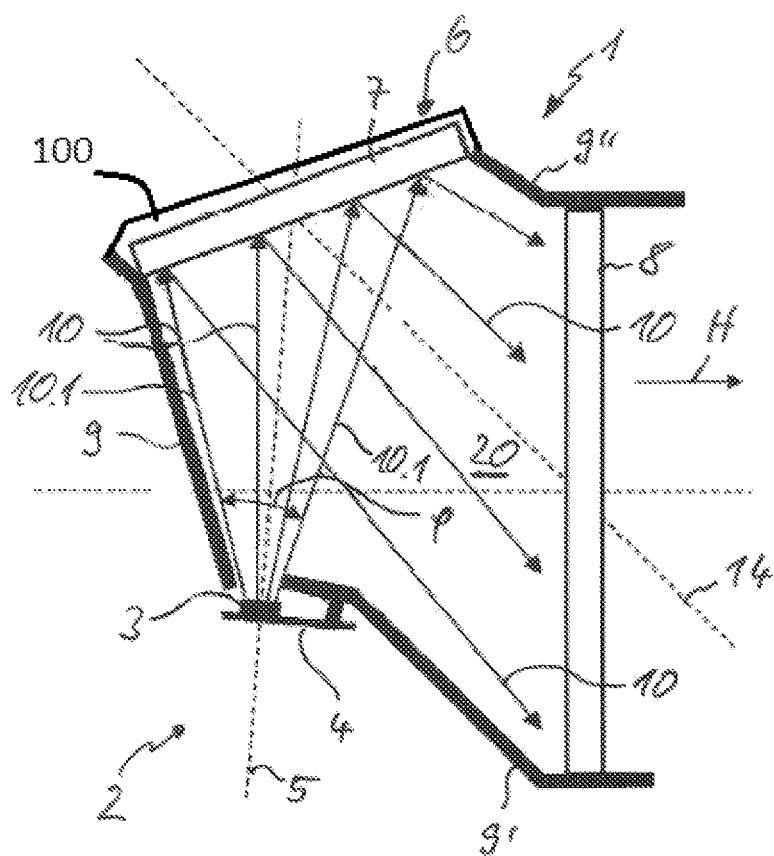
FIG. 2 is a schematic side view of the illuminating device; the drawing does not include screening elements.
Figure 3:
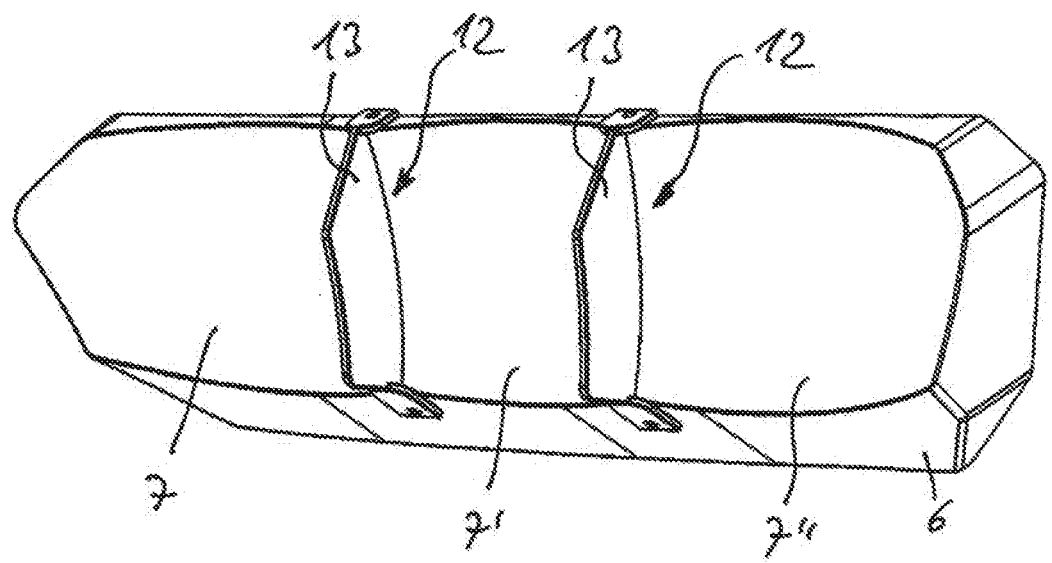
FIG. 3 is a front view of the assembly according to FIG. 1.

An illuminating device in accordance with the invention serves to generate signal functions, such as a rear light, a brake light, a direction indicator, a daylight running light or ancillary brake light function. It can be deployed in the rear or front area of the vehicle or as another light, including but not limited to an interior light inside a vehicle.

The illuminating device provides for a hologram module 1 for generating a specified illuminated holographic figure, which module is arranged in a housing of the illuminating device. In addition to the hologram module 1, a number of further light modules can be arranged within the housing of the illuminating device for generating other light functions. An opening in the housing is closed by a transparent covering plate 100.

The hologram module 1 has a light source unit 2 with several light sources 3, 3', 3". In the present sample embodiment, there are three light sources 3, 3', 3" arranged at a distance a to each other on a common carrier (printed circuit board 4). The light sources 3 are formed as semiconductor-based light sources, for example as LED light sources or as laser light sources. The light source unit 2 is arranged in a lower area of the hologram module 1, where an optical axis 5 of the light sources 3 essentially runs vertically upwards. The light sources 3 are arranged horizontally offset by the distance a. The printed circuit board 4 runs level and essentially in a horizontal direction.

The hologram 1 further has an assembly 6 that is arranged above the light source unit 2 in a vertical direction. The assembly 6 closes off the hologram module 1 upwards. The assembly 6 has several reflectors 7, 7', 7" as optical components that are arranged next to each other in a row. In the present sample embodiment, three reflectors 7, 7', 7" are provided for, where the series of reflectors 7, 7', 7" runs parallel to the printed circuit board 4. A first reflector 7 is allocated to a first light source 3, a second reflector 7' to a second light source 3' and a third reflector 7" to a third light source 3". The carrier 4 and the reflector unit 6 are of an elongated shape.

The hologram module 1 further has a hologram element 8 running essentially vertically that is formed as a flat hologram surface. The hologram element 8 is arranged in the luminous flux downstream in relation to the light sources 3, 3', 3" or, as the case may be, the reflectors 7, 7', 7".

Figure 6:
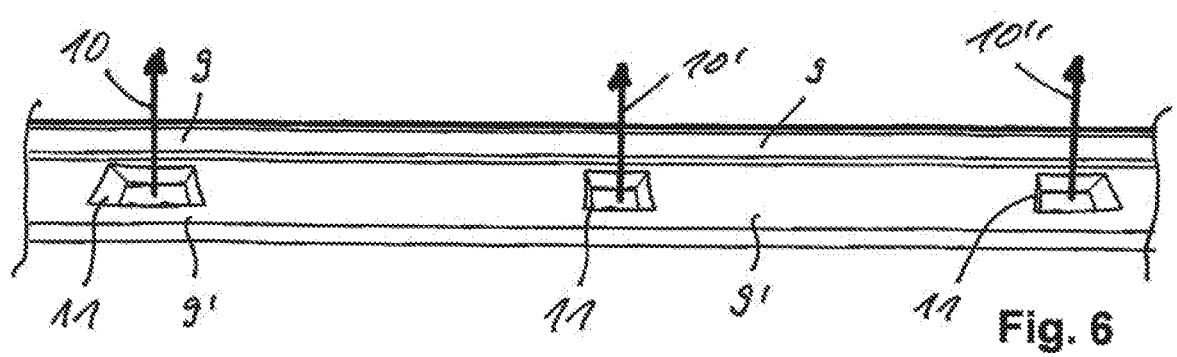
FIG. 6 is a perspective top view of a shutter element with windows to permit the passage of light from three light sources arranged at a distance.

The hologram module 1 is limited by several shutter elements 9, 9', 9" by means of which the light radiation from the respective light sources 3, 3', 3' is limited firstly in the direction of the allocated reflectors 7, 7', 7" and secondly the light reflected by the same in the direction of the common hologram element 8. At the same time, the shutter elements 9, 9', 9" form one housing wall of the hologram module 1. The shutter elements 9, 9' are arranged in such a way that light 10, 10', 10" emitted from the light sources 3, 3', 3" are emitted as it were from an indentation 11 in the hologram module 1. In FIG. 6, the indentation 11 is shown from above.

The shutter elements 9, 9', 9" preferentially have a matte black surface that acts as a diffuser. For example, one inner surface of the shutter elements 9, 9', 9" can be provided with an antireflective coating (moth-eye pattern). The shutter elements 9, 9', 9" are preferentially connected to each other as one piece.

In the present sample embodiment, the shutter elements 9, 9' are arranged in such a way that light 10, 10', 10" radiated by the light sources 3, 3', 3" enters a chamber 20 of the hologram module 1 at an acute emission angle range φ and, as useful light 10, 10', 10", hits the respective allocated reflector 7, 7', 7". The reflectors 7, 7', 7" has a reflector surface formed in such a way that the light 10, 10', 10" is reflected essentially parallelized in the direction of the hologram element 8. The hologram element 8 is flat, taking the form of a transmission hologram element through which the light 10, 10', 10" enters from a rear flat side and exits at a front flat side in the main radiation direction H of the illuminating device. The hologram element 8 is formed as a surface hologram element with a diffractive holographic structure or as a volume hologram element with a transparent photopolymer film. Backlighting of the hologram element 8 with the light 10, 10', 10" (useful light) provides light guidance on the basis of the diffraction structure impressed in the hologram element 8 according to a specified spectral geometrical intensity distribution function. For this purpose, the light sources 3, 3', 3" and reflectors 7, 7', 7" are positioned in such a way that the light 10, 10', 10" hits the hologram element 8 in accordance with the reference or reconstruction direction.

To enable the light 10, 10', 10" of the respective allocated light sources 3, 3' or 3" to hit the reflectors 7, 7', 7" in each case, there is a screening element 13 arranged in the transitional areas 12 of the adjacent reflectors 7, 7', 7", which screening element extends from an extension level E of the assembly 6 in the direction of the hologram element 8. The screening element 13 is formed parallelogram-like and runs essentially in the direction of an optical axis 14 of the reflectors 7, 7' or 7". This ensures that the entire useful light 10, 10', 10" can be reflected by the respective reflectors 7, 7', 7" in the direction of the hologram element 8. Undesired scattered light 15 from the first light source 3 or scattered light 15' from the second light source 3' and scattered light 15" from the third light source 3" that would, without the presence of the screening elements 13, hit the adjacent or the same non-allocated reflectors 7, 7', 7" is prevented from hitting the reflectors 7, 7', 7" or is absorbed by the screening element 13. For this purpose, each of the screening elements 13 has a non-reflective surface or a black and/or matte surface and, if necessary, an antireflective surface coating. The scattered light 15, 15', 15" hitting the screening elements 13 is thus absorbed and cannot stray around in the hologram module 1.

The course of the scattered light 15, 15', 15" is drawn schematically in FIG. 1, in the event that no screening elements 13 are present. In such a case, scattered light would be generated that would cause additional background brightness, which is not desirable. The scattered light 15, 15', 15" is shown as a dashed line in FIG. 1. The useful light 10, 10', 10" is shown as a solid line in FIG. 1.

The shutter elements 9, 9', 9" are arranged or formed in such a way that border rays 10.1 of the light beam 10, 10', 10" hit the transitional area 12 of the reflectors 7, 7', 7".

The reflectors 7, 7', 7" of the assembly 6 are connected to each other as one piece. The assembly 6 can be manufactured by injection molding, for example. Each of the screening elements 13 are produced as separate components that are connected to the reflector unit 6 in a force and/or form-locking manner. Each of the screening elements 13 extend as a flat surface from transitional areas 12 of adjacent reflectors 7, 7', 7".

Figure 4:
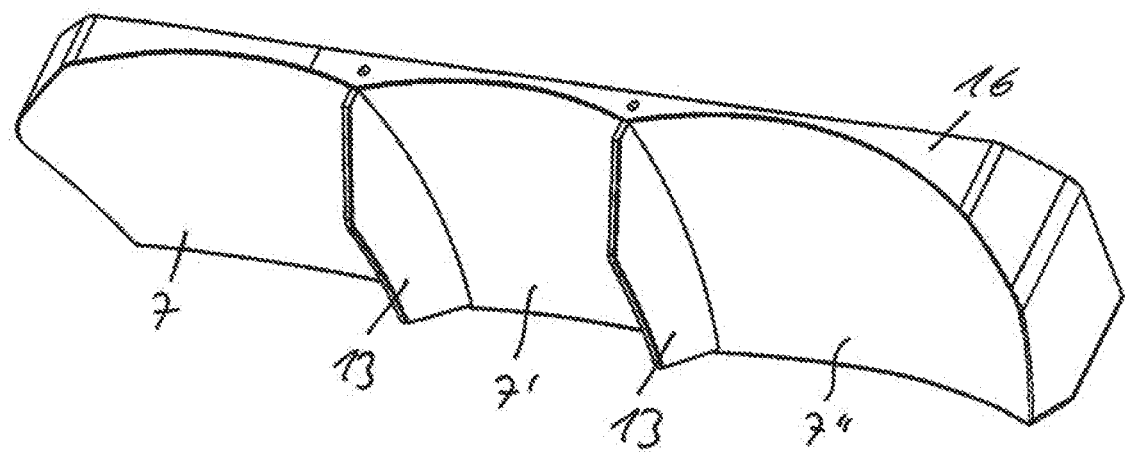
FIG. 4 is a perspective front view of an assembly with screening elements connected as one piece.

In a further embodiment of an assembly 16 according to FIG. 4, the screening elements 13 may also be connected to the reflector unit 16 as one piece. With this embodiment, the screening elements 13 are manufactured with the reflectors 7, 7', 7" by means of injection molding, where the reflectors 7, 7', 7" are additionally provided with a reflective surface coating. The screening elements 13 may remain untreated and are composed of a black plastic material.

Figure 5:
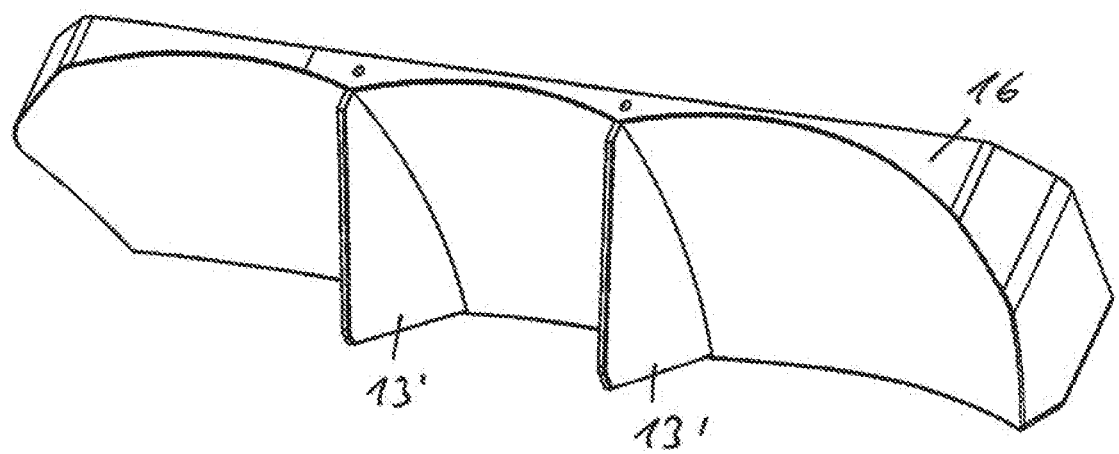
FIG. 5 is a perspective front view of an assembly with triangular end elements that are connected to the assembly as one piece.

In a further embodiment of the invention according to FIG. 5, screening elements 13' may also be triangle-shaped. In a further embodiment of the invention (not shown) the screening elements can, if necessary, also be trapezoidal. The shape of the screening elements 13, 13' depends on the relative geometrical arrangement of the respective light sources 3, 3', 3" to the reflectors 7, 7', 7" and the hologram element 8.

In an embodiment of the invention (not shown), there is no second reflector T arranged adjacent to the reflector 7 with the same light function but rather another optical component, for example a lens, reflector or the like, of another light module for generating another light function. This means that several light modules can also be arranged next to each other in a way that saves space, which constitutes an advantage.

Identical components or component functions in the sample embodiments have been provided with the same reference numbers.

LIST OF REFERENCE NUMBERS

1 Hologram module
2 Light source unit
3,3',3" Light sources
4 Carrier
5 Optical axis
6 Assembly
7,7',7" Reflector
8 Hologram element
9,9',9" Shutter element
10,10',10" Light
11 Indentation
12 Edge area
13,13' Screening element
14 Optical axis
15,15',15" Scattered light
16 Assembly
20 Chamber
E Extension level
a Distance
H Main radiation direction
φ Emission angle range

The invention claimed is:
1. An illuminating device for vehicles, the illuminating device comprising:
   a housing including a first side and a second side, the second side closed by a transparent covering plate;
   a light source unit arranged within the housing on the first side of the housing, the light source unit including a first light source and a second light source;
   an optical unit arranged within the housing, the optical unit including a hologram element, said light source unit and said optical unit arranged to generate an illuminated holographic figure;
   at least one shutter element extending from the optical unit to limit a radiation angle to limit an emission angle range (φ) of the first light source and the second light source;
   wherein the optical unit has a first optical component on the second side of the housing assigned to the first light source and a second optical component on the second side of the housing assigned to the second light source with which light emitted from the respective assigned light source is directed in the direction of the hologram element; and a screening element provided in a transitional area between the first and the second optical component, the screening element extending in such a way that scattered light emitted from the first light source that does not hit the allocated first optical component is prevented from impinging on the adjacent second optical component, and scattered light emitted from the second light source that does not hit the second optical component is prevented from hitting the first optical component.

2. The illuminating device of claim 1, wherein at least one of the first and the second optical component is a reflector.

3. The illuminating device of claim 1, wherein on a side facing the light sources and the hologram element, an extension level (E) extends from the optical component.

4. The illuminating device of claim 3, wherein the screening element extends vertically to the extension level (E) and/or in the direction of an optical axis of the optical component.

5. The illuminating device of claim 1, wherein at least two optical components are arranged next to each other in a row and connected to each other in one piece on the one hand, and wherein the light sources allocated to the respective optical components are arranged on a common carrier at a distance to each other and parallel to the row of optical components on the other hand.

6. The illuminating device of claim 1, wherein the at least one screening element is connected in a force and/or form-locking manner with an assembly with the optical components.

7. The illuminating device of claim 1, wherein the at least one screening element is molded onto an assembly with the optical components.

8. The illuminating in accordance with claim 1 wherein the at least one screening element is provided with an antireflective surface.

9. The illuminating device of claim 1, wherein the at least one screening element is formed as a matte black surface acting as a diffuser.

10. The illuminating device of claim 1, wherein the at least one screening element is formed in the shape of a parallelogram or of a triangle or of a trapeze.

* * * * *